3,772,408
POLYMER BLEND RESIN COMPOSITIONS

Robert L. Lauchlan, Granger, Ind., and Hugh E. Snodgrass, Arcadia, Calif., assignors to Uniroyal, Inc., New York, N.Y.
No Drawing. Filed Mar. 15, 1972, Ser. No. 235,073
Int. Cl. C08f 29/22, 37/18, 41/12
U.S. Cl. 260—876                                                6 Claims

ABSTRACT OF THE DISCLOSURE

Blends of chlorinated polyethylene with alkyl acrylate-vinyl alkylether-acrylonitrile copolymers grafted with styrene-acrylonitrile are characterized by improved impact strength.

BACKGROUND OF THE INVENTION

Alkyl acrylate-vinyl alkylether-acrylonitrile copolymers grafted with styrene-acrylonitrile are known and described in numerous publications including U.S. Pat. No. 3,275,712 of Hans Peter Siebel et al. The aforesaid resins are thermoplastic molding materials possessing good resistance to oxidative embrittlement, UV degradation, and discoloration. However, the alkyl acrylate-vinyl alkyl-ether-acrylonitrile copolymers grafted with styrene-acrylonitrile presently available are limited in their end use application by low impact strength.

STATEMENT OF THE INVENTION

The present invention relates to blends containing between about 99 and 80% of thermoplastic alkyl acrylate-vinyl alkylether-acrylonitrile copolymers grafted with styrene-acrylonitrile and 1 to 20 percent (all percentages are expressed by weight herein) of a chlorinated polyethylene. The blends are characterized by substantially improved impact strength. Of note is the fact that the incorporation of chlorinated polyethylene does not adversely affect such desirable properties of the graft copolymer as good resistance to the effects of weather aging.

DESCRIPTION OF THE INVENTION

In describing the graft copolymer utilized in preparing the blend of this invention, reference may be made to the Report of Nomenclature of the Internation Union of Pure and Applied Chemistry [published in the Journal of Polymer Science, volume 8, page 260, (1952)] wherein the term "graft copolymerization" is employed to designate a given process. This process is the polymerization of a mixture of polymerizable monomers in the presence of a previously formed polymer or copolymer. A graft copolymer is a high polymer, the molecules of which consist of two or more polymeric parts of different composition chemically united together.

For purposes of this invention, the graft copolymer resin is produced by polymerization of 50 to 85% by weight alkyl acrylate, 5 to 20% by weight acrylonitrile, and 10 to 40% by weight vinyl alkyl ether to form a copolymer spine, with subsequent polymerization of two kinds of monomers onto said copolymer spine.

Ten (10) to 90% by weight (based upon the copolymer spine) of styrene and acrylonitrile in the ratio of between 60:40 and 90:10 is added to the aqueous dispersion of the copolymer spine and polymerized to form the graft copolymer.

The graft copolymer is then mixed with a preformed copolymer of styrene and acrylonitrile having a monomer ratio of between 60:40 and 90:10, so that 10 to 35% by weight (with reference to the solids content of the whole mixture) of the graft copolymer is contained in the polymer mixture.

Suitable alkyl acrylates, which constitute 50 to 85% by weight of the graft copolymer spine are those having four to eight carbon atoms in the alcohol component of the ester. Examples of such alkyl acrylates include n-butyl acrylate, t-butyl acrylate, hexyl acrylate, ethylcyclohexyl acrylate. Mixtures of these acrylates within the stated amounts may also be used.

Suitable vinyl alkyl ethers, which constitute 10 to 40% by weight of the graft copolymer spine, are those having alkyl groups of one to 8 carbon atoms. Vinyl methyl ether is preferably used as the vinyl alkyl ether component, but vinyl ethyl ether, vinyl butyl ether, vinyl isobutyl ether, or the ethers of higher alcohols may also be used. Mixtures of these ethers within the stated amounts may also be used.

Acrylonitrile constitutes at least 5%, but no more than 20% of the graft copolymer spine.

Preferably, the copolymer spine consists of 60 to 70% by weight of alkyl acrylate, 15 to 30% by weight of vinyl alkyl ether, and 8 to 12% of acrylonitrile.

The monomers which are graft polymerized on the copolymer spine are styrene or alpha methyl styrene and acrylonitrile or methacrylonitrile or combinations thereof.

Finally, the graft copolymer is admixed with a sufficient amount of a preformed copolymer of styrene and acrylonitrile, so that a resinous thermoplastic mixture results.

Styrene and acrylonitrile in the ratios indicated above comprise the preformed copolymer which constitutes between 65 and 90% by weight (with reference to the total mixture) of the thermoplastic resin mixture.

Copolymerization and admixture of the components which constitute the graft copolymer resin may be carried out by any conventional method and does not form part of the subject matter of the present invention. The preparation and characteristics of such alkyl acrylate-vinyl alkylether-acrylonitrile copolymers grafted with styrene-acrylonitrile are described in several publications, including U.S. Pat. No. 3,275,712, the contents of which are incorporated herein by reference.

The chlorinated polyethylene that is blended with the graft copolymer contains chlorine in a range of from about 20% to about 55% by weight. The polyethylene is derived from either a high density linear polyethylene or a low density high pressure polyethylene as outlined by M. A. Smook et al. in Polythene, pages 267–272 published by Interscience (1957).

In the compositions of the present invention, the chlorinated polyethylene comprises from 1 to 20 percent of the blend, and more preferably from 5 to 15 percent of the blend. Correspondingly, the alkyl acrylate-vinyl alkylether-acrylonitrile copolymers grafted with styrene-acrylonitrile constitutes at least 80% of the blend and more preferably between 85 and 95% of the blend.

The method of blending the graft copolymer resin with the chlorinated polyethylene is not critical, and does not constitute a part of this invention. Preferably the resin and elastomer are physically admixed by means of any mechanical mixing device conventionally used for mixing rubbers or plastics, such as an extruder, Banbury mixer, or differential roll mill. In order to facilitate thorough mixing of the polymers and to develop the desired improved combination of physical properties, the mechanical blending is carried out at sufficiently high temperatures to soften the polymers so that they are thoroughly dispersed and intermingled with each other.

Alternatively the matrix resin and chlorinated polyethylene may be solution blended by dissolving the polymers in a solvent such as methyl ethyl ketone and subsequently precipitating the polymer blend by adding the solution to a non-solvent such as isopropanol, producing a homogenous blend which is then dried by a suitable method. The blend can then be molded at a temperature above its softening point.

The mixtures of the invention may contain certain other additives to plasticize, lubricate, dye, pigment, prevent oxidation of, retard flammability of, etc., the resin blends. Such additives are well known in the art and may be incorporated without departing from the scope of the invention.

The advantage which results from this invention is that it provides a new class of polymer blend resin compositions characterized by a unique combination of physical properties. In particular, one may advantageously utilize the good weather resistance of the graft copolymer resins, and through the incorporation of a chlorinated polyethylene obtain compositions having very high impact strength, without detrimentally affecting the other strength properties of the resin.

Further benefits obtained by blending a chlorinated polyethylene with an alkyl acrylate-vinyl alkylether-acrylonitrile copolymer grafted with styrene-acrylonitrile are illustrated in the following examples, which are set forth as a further description of the invention, but are not to be construed as limiting the invention thereto.

EXAMPLE 1

An alkyl acrylate-vinyl alkylether-acrylonitrile copolymer grafted with styrene-acrylonitrile was blended with a chlorinated polyethylene at the 5, 10, 15 and 25% by weight level. The graft copolymer consisted of:

|  | Percent by weight |
|---|---|
| Acrylonitrile | 28 |
| Butyl acrylate | 13 |
| Vinyl methyl ether | 5 |
| Styrene | 54 |

The chlorinated polyethylene, coded Tyrin MX2243.25 and manufactured by Dow Chemical Co., was characterized by a melt viscosity of 19,000 poise at a shear rate of 150 seconds$^{-1}$ and a temperature of 190° C. and a chlorine content of 48%. The polymers were blended in a Banbury internal shear mixer at a temperature of 320° F. and a shear rate of 300 sec.$^{-1}$ for a period of seven minutes. The polyblend was subsequently milled and calendered at 300° F. and then compression molded into plaques ¼" in thickness at 300° F. and 350 p.s.i.

The impact strength of the polyblend was measured following the procedure of ASTM D256A-56. The polyblends exhibited significantly higher impact strengths than the unmodified graft copolymer, as outlined in Table I.

TABLE I

|  | Notched Izod impact strength, ft. lbs./in. |
|---|---|
| 100 graft polymer | 0.8 |
| 95 graft polymer/5 chlorinated PE | 1.2 |
| 90 graft polymer/10 chlorinated PE | 9.9 |
| 85 graft polymer/15 chlorinated PE | 5.6 |
| 75 graft polymer/25 chlorinated PE | 15.6 |

EXAMPLE 2

A chlorinated polyethylene containing 36% chlorine was blended with the alkyl acrylate-vinyl alkylether-acrylonitrile copolymer grafted with styrene-acrylonitrile as described in Example 1 at the 15% weight level. The chlorinated polyethylene coded Tyrin CPE 3614 and manufactured by Dow Chemical Co., was characterized by a melt viscosity of 24,000 poise at a shear rate of 150 seconds$^{-1}$ and a temperature of 190° C. The polymers were blended, fabricated and tested as described in Example 1. The polyblend exhibited an impact strength of 10.4 ft. lbs./in. compared to 0.8 ft. lbs./in. for the unmodified graft copolymer.

EXAMPLE 3

A chlorinated polyethylene containing 25% chlorine was blended with the alkyl acrylate-vinyl alkylether-acrylonitrile copolymer grafted with styrene-acrylonitrile as described in Example 1 at the 15% weight level. The chlorinated polyethylene coded Tyrin MX 2243.28 and manufactured by Dow Chemical Co., was characterized by a melt viscosity of 12,500 poise at a shear rate of 150 seconds$^{-1}$ and a temperature of 190° C. The polymers were blended, fabricated and tested as described in Example 1. The polyblend exhibited an impact strength of 2.9 ft. lbs./in. compared to 0.8 ft. lbs./in. for the unmodified graft copolymer.

Because of their unique combination of high impact strength and excellent resistance to the effects of weather aging, the polymer blends of this invention have many and varied uses. For example, they can be used as molding compounds for the production of enclosures, furniture, and other goods especially suited for outdoor usage. They can be used to prepare extruded sheets and shapes for outdoor siding which requires both good weather resistance and high impact strength. They can be used in molding powder formulations either alone or mixed various fillers to make molded parts and articles such as gear, ratchets, bearings, cams, impacts parts, gaskets, valve seats, bottles, containers, and the like. They can be used to prepare molded, calendered or extruded articles, films, coatings, threads filaments, tapes and the like. They can be applied to a broad spectrum of uses in forms of sheets, rods, tapes and the like. Obviously, other modifications and variations of the present invention are possible in light of the above disclosures. It is, therefore, to be understood that changes may be made in the particular embodiments of the invention described which are within the full intended scope of the invention as defined by the appended claims.

Having thus described our invention, what we claim and desire to protect by Letters Patent is:

1. A blend composition having improved impact strength and processability comprising:
   (A) between about 80 and 99% by weight of a matrix polymer consisting essentially of
      (a) between 10 and 35% by weight of a graft copolymer consisting essentially of a spine of:
         (i) 50 to 85% by weight of alkyl acrylate having four to eight carbon atoms in the alcohol component of the ester,
         (ii) 10 to 40% by weight of vinyl alkyl ethers, said alkyl group containing one to eight carbon atoms, and
         (iii) 5 to 20% by weight of acrylonitrile, said spine being grafted with 10 to 90% by weight, based upon the spin, of styrene and acrylonitrile in the ratio between 60:40 and 90:10 respectively, and
      (b) between 90 and 65% of a separately prepared copolymer resin of styrene and acrylonitrile, having monomer ratios between 60:40 and 90:10 respectively, in admixture with
   (B) between about 1 and 20% of a chlorinated polyethylene.

2. The composition defined in claim 1 wherein said alkyl acrylate is selected from the group consisting of n-butyl acrylate, t-butyl acrylate, hexyl acrylate and ethylcyclohexyl acrylate.

3. The composition defined in claim 1 wherein said vinyl alkyl ether is selected from the group consisting of vinyl methyl ether, vinyl ethyl ether, vinyl butyl ether and vinyl isobutyl ether.

4. The composition defined in claim 1 wherein said alkyl acrylate is selected from the group consisting of n-butyl acrylate, t-butyl acrylate, hexyl acrylate and ethylcyclohexyl acrylate, and said vinyl alkyl ether is selected from the group consisting of vinyl methyl ether, vinyl ethyl ether, vinyl butyl ether and vinyl isobutyl ether.

5. The composition defined in claim 4 wherein said alkyl acrylate is n-butyl acrylate and said vinyl alkyl ether is vinyl methyl ether.

6. The composition defined in claim 5 wherein said chlorinated polyethylene contains between about 20 and 55% by weight chlorine.

References Cited

UNITED STATES PATENTS 3,275,712  9/1966  Siebel et al. _____ 260—876 R
3,520,953  7/1970  Sugimoto et al. ____ 260—876 R MURRAY TILLMAN, Primary Examiner J. ZIEGLER, Assistant Examiner U.S. Cl. X.R.

260—29.6 CM, 31.2 N, 881